United States Patent [19]
Sato et al.

[11] 3,958,019
[45] May 18, 1976

[54] COLOR TREATMENT FOR SOYBEAN FOOD PRODUCTS
[75] Inventors: Kunito Sato, Chicago; Alfred F. Miller, Jr., Woodridge, both of Ill.
[73] Assignee: Armour and Company, Phoenix, Ariz.
[22] Filed: July 29, 1974
[21] Appl. No.: 492,619

[52] U.S. Cl.............................. 426/250; 426/268; 426/540; 426/802
[51] Int. Cl.² ........................................ A23L 1/275
[58] Field of Search ........... 426/250, 262, 268, 540, 426/802

[56] References Cited
UNITED STATES PATENTS
3,528,822  9/1970  Borenstein...................... 426/250 X
3,846,566  11/1974  Blomstrom.......................... 426/250

*Primary Examiner*—James R. Hoffman
*Attorney, Agent, or Firm*—Frank T. Barber; Carl C. Batz

[57] ABSTRACT

A process for preparing a soybean protein material having a red color which when combined with uncured meat makes a product having a uniform red color in the raw state and which when cooked has a uniform grey-brown color similar to cooked natural meat. This combined product is prepared by treating the soy protein material with a combination of the colorants betanin and canthaxanthin. The disclosure is directed to the special colored soy protein product, and also its combination with uncured meats.

21 Claims, No Drawings

COLOR TREATMENT FOR SOYBEAN FOOD PRODUCTS

This invention relates to a color treatment of soybean proteins and to food products containing such treated proteins.

BACKGROUND OF THE INVENTION

Soybeans have long been recognized as a good source of food proteins, and soybean protein materials are coming into substantial use either in place of other natural foods or in combination with such other foods. The soybean proteins are nutritious, can be made available in large quantities, and are economically produced. There is great incentive to the preparation of soybean protein materials, particularly for use inplace of or as extenders in combination with meats. The soybeams are grown directly from the soil and in this respect have a great economic advantage over meats which are obtained by feeding vegetable foods to livestock animals and then slaughtering the animals.

In the development of soybean protein materials for use in place of or along with meats three principal obstacles have confronted the art. One of these is flavor, and another is odor, each of which is characteristic of soybean materials and which is unnatural and unpleasant in most foods, and the third obstacle is the color of the soybean protein materials which is unnatural to the meats being simulated, and which is also unpleasant particularly when the soybean materials are used along with meat. The objectionable flavor and odor problems have now been substantially disposed of through improvements in the preparation of the protein materials from the soybean source, but the color problem has persisted.

Many commercial processors of soybean products now make and sell a soybean protein material which is satisfactory as to flavor and odor and which may take one of several specific forms. Some specific products of this type have been treated to give the products a texture similar to the texture of meat and others are in powder, granular or flake form. These products are available in their texturized form, as a flour, or as having various concentrations of protein. The form known as isolate contains of the order of 90% protein. None of them, to my knowledge, is quite satisfactory in color for use in place of or along with meat. One such product which is sold under the trade designation "Supro 50" is quite satisfactory as to odor and texture, but is tan in color and because of its color is quite incompatible with meat such as hamburger or sausage. When such tan colored protein material is mixed in ground uncured meat the mixture has a mottled, unattractive appearance. Even though it could be possible to discover a coloring material which would simulate the color of a meat such as raw hamburger, this would not be expected to solve the problem because of the expectation that it would create a different mottled appearance upon the cooking of the meat. The uncured meat turns a grey-brown color when cooked, but the added coloring material would be expected to retain its same color resulting in a very unsatisfactory color effect. On the other hand, if a coloring material could be found which would simulate the brown color of cooked uncured meats it would still be unsatisfactory because of the mottled effect in the raw meat. Therefore, it is necessary not only that the soybean protein material assume a color like the color of the raw meat it is to be placed with, but also that its reaction to the heat of cooking be similar to that of the meat.

SUMMARY OF THE INVENTION

I have discovered a color treatment for soybean protein materials which utilizes a combination of coloring compounds and which not only produces more precisely the raw uncured meat color which is desired, but which changes color upon exposure to cooking temperatures in a similar manner and to a similar degree as does uncured meat itself. The coloring compounds involved in this improvement are betanin and canthaxanthin.

DETAILED DESCRIPTION

The pigment betanin is known and is derived from the red beet (*Beta vulgaris*). It is prepared and sold by several manufacturing houses. One such betanin preparation is in liquid form and sold under the code name "Nature Red B-20" food color. This preparation contains about 0.2 percent of betanin on a weight basis.

The pigment canthaxanthin is also known per se and preparations of this are also sold on the market. One such preparation is sold under the code designation "Roxanthin Red 10". This preparation contains about 10% canthaxanthin on a weight basis.

Neither betanin nor canthaxanthin will separately impart to soybean protein material the color characteristics which are desired, but quite unexpectedly, their combination does.

In carrying out my improvement I may first prepare an aqueous mixture of the colorants in an amount which can be absorbed into the amount of soy protein material to be treated. I have learned from experience that up to about three parts by weight of liquid may be absorbed into one part of dry soy protein material, so I may make the aqueous colored mixture starting with water in an amount of 1.0 to 3.0 parts, preferably 2.2 to 2.5 parts, by weight, of water to 1 part of the dry soy protein to be treated. More or less water may be used, but it is preferable not to use more than can be easily absorbed by the dry soy protein.

The colorants may then be added to the water to make the liquid colorant mixture. The betanin colorant preferably may be added in the amount of from 0.0001 to 0.05, preferably from 0.001 to 0.012% based on the dry weight of the betanin and the dry weight of the soy protein to be treated, and the canthaxanthin colorant preferably may be added to the water in the amount of from 0.00001 to 0.02 preferably from 0.0001 l to 0.0056% based on the dry weight of the canthaxanthin and the dry weight of the say protein to be treated. The canthaxanthin colorant is less soluable and for convenience the canthaxanthin colorant may first be dispersed in a small quantity of warm water and this added to the main body of the water. In the liquid colorant mixture the betanin may be in solution form while the canthaxanthin is in the form of a dispersion.

It may be understood that commercial forms of betanin contain other ingredients. For example, the Nature Red B-20 betanin preparation contains in addition to betanin amounts of sugars and other solids from red beets, and Roxanthin Red 10 contains a matrix of gelatin, vegetable oil, sugar and starch. The percentages of colorants above mentioned are given on the basis of the weight of the betanin or canthaxanthin contained in the preparation which may be added with respect to the dry weight of the soybean protein material which is to be treated.

Following the preparation of the aqueous colorant mixture the dry soy protein material is added to the mixture and given time to absorb the liquid.

After absorption of the liquid mixture the soy protein material appears as a red or a deep red resembling the red of raw uncured meat. Further the treated soy protein material may be cooked as meat such as sausage or hamburger would be cooked, the color changing upon cooking to a grey-brown color similar to the cooked color of 100% uncured meat.

In out improved treatment we prefer to use a soy material which contains the protein in concentrated form. We prefer that the material contain the soy protein in an amount of 50% or more on a dry basis, and have obtained good results using the soy isolate which contains protein in the amount of 90% or more, on a dry basis. We also prefer that the soy material be of the type which has been treated to give it a texture. The texturized form is commercially available and the soy material maybe obtained commercially in various concentrations. We may also use the soy material in flour form, or in the form of flakes or granules.

The treated soy material may be formed into patties or stuffed into casings and cooked, for example by frying or broiling, and eaten. But it is an important feature of our invention that the treated raw protein be mixed with uncured meat which has been ground or otherwise comminuted. The mixture may be in any proportion. Usually the mixture will contain from 5 to 90% of soy protein based on the weight of hydrated protein as compared to the total weight of the mixture, and preferably from 20 to 50%.

The uncured meat with which the treated soy protein material is mixed may come from any animal source but preferably beef, pork or lamb. It is possible to apply our process to meats from other sources such as buffalo, rabbit and poultry, but with varying economical advantage. It is required however that the meat be uncured, and by this we mean meats which have not been treated with curing agents such as nitrates and nitrites. It should be understood however, that by the use of this term we do not exclude those meats which have been salted to taste or contain less than a small quantity, of the order of 2 or 3% of salt, which meats are classed as "fresh" instead of "cured". When curing agents such as nitrates and nitrites are added to meat these agents themselves alter the color of the meat and the color conditions become quite differert from those of fresh or uncured meats.

An alternate way of incorporating the combined colorants is to mix the soy protein material to the ground beef, pork, or other meat in a desired proportion and then treat this mixture with the colorant mixture prepared as previously described. In this case the amount of each colorant may be as previously described except for being based on the total weight of the dry soy protein material and the meat containing its natural moisture. Again water should be inluded in the liquid colorant in an amount which will be completely absorbed by the meat and soy protein composition. By this practice the meat, as well as the soy protein material, is colored, yet upon cooking the added color breaks down and the combined means and soy protein assumes its usual grey-brown color.

Although the colorants may be added to the amount of water to be absorbed and the colored aqueous solution added at once to the soy material, an alternate procedure is to add the entire amount of the colorants to only a part of the water and first add the colored solution to th soy material, then at a later time the remainder of the water may be added to the mixture of meat and soy material. Conveniently, the remaining water may be added in the form of ice.

I prefer the practice of first treating the soy protein material for color before it is combined with the meat. However, it is possible to create various types of products by first combining the uncured meant and soy protein material combination. The same results may be obtained both as to the color of the raw meat and as to the color of the meat when it is cooked, and the treatment using the liquid colorant may be performed in the same way, except that the amount of colorants should be determined on the basis of the total weight of the dry soy protein material and the meat containing its natural moisture. This is because by this practice the colorant is being applied to the meat as well as the soy material.

In the following paragraphs specific examples and tests will be reported for the purposes of more complete description of the invention.

To explore the effect of using the combined betanin and canthaxanthin coloring agents as compared with using one or the other of these agents I tried using only the betanin colorant at various levels, and compared these with the use of the combined betanin and canthaxanthin at various levels. The results of these tests are given in Table No. 1.

TABLE NO. 1

| Level of colorant | | | |
|---|---|---|---|
| Nature Red B-20 (ml.) | Roxanthin Red 10 (mg.) | Water (ml.) | Color of Liquid Mixture |
| 5 | — | 940 | light purple-red |
| 7 | — | 938 | purple-red |
| 10 | — | 935 | dark purple-red |
| 7 | 100 | 938 | red |
| 10 | 100 | 935 | deep red |
| — | 100 | 945 | orange |
| — | 500 | 945 | orange-red |
| — | 1000 | 945 | deep orange-red |

A typical formula for the liquid colorant mixture is given in Table No. 2.

TABLE NO. 2

| Ingredients | Amount |
|---|---|
| Water | 1800 g. |
| Nature Red B-20 | 10 ml. (11.7g.) |
| Roxanthin Red 10 | 200 mg. |

A typical formula for rehydrating the soy protein material is given in Table 3. This table further gives amounts typically used in adding the same to ground beef.

TABLE NO. 3

| Water or Water with Colorants | Soybean Protein Material | Amount of Hydrated Soybean Protein Material Added to 10 lb. Meat |
|---|---|---|
| 1600 g. (3.52 lb.) or | 720 g. (1.59 lb.) | 3.34 lb. |
| 1800 g. (3.96 lb.) | 720 g. (1.59 lb.) | 3.34 lb. |

Tests were made to compare color using different beef cuts, containing different amounts of fat, and comparing the color using soy protein with and without the color treatment. These tests are reported in Table 4. In each case 3.34 pounds of rehydrated textured soy protein were added to 10.0 pounds of meat. The colorants were the same as set forth in Table 1.

TABLE NO. 4

| Product | Color of Meat | Percent Moisture | Percent Protein | Percent Fat |
| --- | --- | --- | --- | --- |
| 100% beef chuck | | | | |
| Ground beef | bright red | 67.2 | 17.5 | 14.9 |
| Ground beef and soy protein | red, mottled tan | 66.4 | 15.8 | 16.4 |
| Ground beef + soy protein + colorants | red | 65.1 | 15.7 | 17.8 |
| 75% beef chucks + 25% beef plates | | | | |
| Ground beef | bright red | 58.6 | 18.4 | 20.1 |
| Ground beef + soy protein | red, mottled tan | 64.2 | 17.0 | 19.1 |
| Ground beef + soy protein + colorants | red | 63.2 | 17.0 | 17.1 |
| 50% beef chucks + 50% beef plates | | | | |
| Ground beef | bright red | 54.8 | 15.9 | 29.5 |
| Ground beef + soy protein | red, mottled tan | 60.5 | 15.7 | 19.8 |
| Ground beef + soy protein + colorants | red | 61.0 | 14.4 | 22.6 |

As shown by the data of Table 4 ground beef with the special colored soy protein had a color superior to beef with uncolored hydrated soy protein contained therein.

Tests were conducted to determine color preference in a panel of 32 persons with the result that 30 of the 32 panelists could tell the difference in color between ground beef (with 25% hydrated soy protein) in which the soy protein had been treated with the colorants described in Table No. 1, and the comparable ground beef product in which the soy protein was untreated. Twenty-seven out of the 32 panelists preferred the color of the beef patties containing colored soy protein to that of the patties having uncolored soy protein. None of the panelists could distinguish the color of the uncolored soy patties from those having the color treatment after the patties were cooked, and the test showed no significant difference between the flavor of the untreated and the color treated patties.

Tests were conducted to determine whether the color treatment has any effect on the development of bacteria with the result that there was found to be substantially no difference between the treated and the control patties either as to total count, coliform or lactic acid bacteria.

Tests were conducted to determine the effect of storage on the color treated patties patties as compared to untreated patties, with the result that the effect was found to be the same. It was found that the untreated beef and soy patties were initially red with mottled tan appearance while the color treated patties were red. At the end of 2 days in a retail display case at 36°F. both patties were brown-red, and at the end of 3 days both types of patties were brown in color.

Tests similar to those above described for beef wer also conducted on fresh pork sausage, and it was found the special color treatment has even greater advantages when applied to pork sausage.

While I have described in detail certain colored soy protein material and combinations of such material with certain uncured meats, it is to be understood that the invention may be varied widely and embodied in many specific combinations, all within the spirit of the invention and within the scope of the appended claims.

We claim:

1. A food comprising a mixture of uncured meat and a soybean protein material which contains betanin in an amount of from 0.0001 to 0.05% by weight and canthaxanthin in the amount of from 0.00001 to 0.02% by weight, said percentages being based on the amount by weight of said colorants with respect to the dry weight of said soy protein material.

2. A food as set forth in claim 1 in which said soy material is contained in said mixture in an amount of from 20 to 50% based on the hydrated weight of said material and the total weight of said mixture.

3. A food as set forth in claim 1 in which said meat is sausage.

4. A food as set forth in claim 1 in which said meant is ground beef.

5. A food as set forth in claim 1 in which said meat is sausage.

6. An uncooked soybean food material containing betanin in an amount of from 0.0001 to 0.05% by weight and canthaxanthin in an amount of from 0.00001 to 0.02% by weight, said percentages being based on the amount by weight of said colorants with respect to the dry weight of said material.

7. An uncooked soybean food material as set forth in claim 6 in which said material contains betanin in an amount of from 0.001 to 0.012% and contains canthaxanthin in an amount of from 0.0001 to 0.0056%, said percentages being based on the dry weight of the colorants and the dry weight of said soybean protein material.

8. An uncooked soybean food material as set forth in claim 6 wherein said material is a textured soybean protein material.

9. An uncooked soybean food material as set forth in claim 6 wherein said material contains protein in an amount of at least 50% on a dry basis.

10. An uncooked soybean food material as set forth in claim 6 wherein said material contains protein in an amount of at least 90% on a dry basis.

11. A process for treating a soybean protein material to improve its color comprising mixing with and absorbing into said material an amount of an aqueous mixture containing betanin in an amount of from 0.0001 to 0.05% and canthaxanthin in an amount of from 0.00001 to 0.02%, said percentages being based on the amount by weight of said colorants with respect to the dry weight of said soybean protein material.

12. A process as set forth in claim 11 including the step of adding said material after treatment with betanin and canthaxanthin to uncured meat to prepare a combined product containing said meat and said material.

13. A process as set forth in claim 11 including the step of cooking said treated material.

14. A process as set forth in claim 11 wherein said material is a texturated soybean protein material.

15. A process as set forth in claim 11 wherein said material contains protein in an amount of at least 50% on a dry basis.

16. A process as set forth in claim 11 wherein said material contains protein in an amount of at least 90% on a dry basis.

17. A process as set forth in claim 11 in which said aqueous mixture contains water in an amount from about 1 to 3 parts of water to 1 part dry weight of said soybean protein material.

18. A process as set forth in claim 11 which includes adding said soybean protein material to uncured meat to prepare a combined product containing said meat and said material prior to mixing said aqueous mixture therewith.

19. A process for preparing a cooked soybean protein material of improved color comprising cooking raw soybean material containing betanin in an amount of from 0.0001 to 0.05% and containing canthaxanthin in an amount of from 0.00001 to 0.02% by weight, said percentages being based on the amount by weight of said colorants with respect to the dry weight of said soybean protein material.

20. A process as set forth in claim 19 in which said raw soybean material is mixed with uncured meat prior to said cooking step.

21. A process as set forth in claim 19 in which said percentage of betanin is from 0.001 to 0.012 and said percentage of canthaxanthin is from 0.0001 to 0.0056.

* * * * *